United States Patent
Strauss

[11] 3,792,485
[45] Feb. 12, 1974

[54] SINGLE LENS REFLEX CAMERA WITH CORRECTION FOR EFFECT OF STRAY LIGHT

[75] Inventor: Karl-Peter Strauss, Volkmarode, Germany

[73] Assignee: Rollei-Werke Franke & Heidecke

[22] Filed: Mar. 21, 1973

[21] Appl. No.: 343,257

[52] U.S. Cl............ 95/10 CE, 95/10 CT, 95/10 CD, 95/42, 352/141
[51] Int. Cl....... G03b 7/08, G01j 1/46, G03b 19/12
[58] Field of Search 95/10 C, 10 CE, 10 CT, 10 CD, 95/42; 352/141

[56] References Cited
UNITED STATES PATENTS

| | | | |
|---|---|---|---|
| 3,636,839 | 1/1972 | Yamamoto | 95/42 X |
| 3,683,766 | 8/1972 | Nobusawa | 95/10 CT |
| 3,643,563 | 2/1972 | Nobusawa | 95/42 X |
| 3,678,826 | 7/1972 | Mori et al. | 95/10 CT |
| 3,693,518 | 9/1972 | Yamada | 95/10 CT |
| 3,731,604 | 5/1973 | Fujii | 95/10 CT |

*Primary Examiner*—Joseph F. Peters, Jr.
*Attorney, Agent, or Firm*—Charles Shepard

[57] ABSTRACT

A single lens reflex camera in which one of the exposure factors (diaphragm aperture or shutter speed) is automatically set by means responsive to the light from the scene to be photographed. The photoelectric converter which receives light from the scene, is subject also to the influence of possible stray light. A circuit arrangement is provided for storing the voltage produced by the stray light falling on the photoelectric converter. Then when the light from the scene to be photographed falls on the photoelectric converter, only the excess of the voltage then produced by stray light plus scene light, over the previously stored voltage produced by the stray light alone, is used in setting the automatically settable exposure factor, thereby compensating for the effect of stray light.

7 Claims, 3 Drawing Figures

SINGLE LENS REFLEX CAMERA WITH CORRECTION FOR EFFECT OF STRAY LIGHT

BACKGROUND OF THE INVENTION

The invention relates to a single lens reflex camera in which one of the variable exposure factors (diaphragm aperture or shutter speed) is automatically set by mechanism including electronic circuits responsive to the amount of light from the scene to be photographed. Many forms of such cameras are well known in the art. The present invention relates particularly to the kind or style of single lens reflex camera in which there is a photoelectric converter arranged behind the lens system to receive light (when the shutter is open) from the scene to be photographed. The scene light falling on the photoelectric converter affects the circuit of the converter in known manner, proportional to the intensity of light falling on the converter, and this circuit, in turn, determines the setting of the variable exposure factor, usually the setting of the aperture of the diaphragm, although it could be the setting of the shutter speed or time of exposure.

As above stated, this is known in the art. Merely as one example of a known arrangement where the light falling on a photoelectric converter serves to control the setting of a diaphragm aperture, see the copending U.S. Pat. application of Bodo Mielke, Ser. No. 335,914 , filed Feb. 26, 1973, Rollei case A 866/899 US, owned by the owner of the present application. The disclosure of the copending application is incorporated herein by reference.

In certain types of such cameras, having an objective shutter (also sometimes called a central shutter) the shutter is normally open for viewfinding purposes, the unexposed film being protected meanwhile by the position of the reflex mirror, possibly supplemented by a protective closure flap. The shutter mechanism and the associated mechanism for moving the reflex mirror and the cover flap are so programmed, in known manner, that when the shutter release is actuated to initiate the exposure cycle, the shutter closes, then the reflex mirror and the protecting flap are moved from viewing position to picture-taking position, and then the shutter opens and closes to make the exposure. Then the reflex mirror and the closure flap return from picture-taking position to viewing position, and the shutter can be opened again for viewing the next scene by means of the reflex mirror.

When the photoelectric converter is mounted behind the lens, it is found that stray light penetrating from the adjusting disk or from other sources may fall on the converter, thus giving a false measurement and resulting in an incorrect exposure. Attempts have been made to compensate for this interference light or stray light by mounting the photoelectric converter for the incident view-finder rays in a position behind the hinged reflex mirror or behind the light guiding means by which the light coming from the adjusting disk was not transmitted any further. These measures have only partially eliminated the problem of interference light or stray light. The object of the present invention is to obtain complete compensation for stray light, without recourse to any appreciable mechanical auxiliary devices.

SUMMARY OF THE INVENTION

According to the present invention, the effect of stray light or interference light on the photoelectric converter is completely eliminated by closing the shutter during the preprogramming stage just before the normal programmed exposure cycle begins, so that the photoelectric converter is then subjected only to stray light or interference light, and the value of the stray light is stored in a suitable storage device such as a capacitor. Then the shutter is opened and at this time the photoelectric converter will be subjected to the same stray light as before, plus the scene light from the scene to be photographed. Only the value by which this total of stray light plus scene light exceeds the previously stored value of the stray light alone, is used for controlling the setting of the diaphragm aperture, or controlling the setting of the shutter speed if this automatic mechanism is used to set shutter speed rather than diaphragm aperture. In this way, the effect of stray light or interference light is completely eliminated in a simple and reliable manner.

The opening of the shutter to obtain a reading of the stray light plus the scene light, can be the same opening which produces the exposure on the film, or can be a separate and preliminary opening occurring very briefly for the purpose of obtaining the measurement of stray light plus scene light, while the film is still protected from exposure by the reflex mirror. If this system is used, then the shutter is quickly closed again after the reading is obtained, and the reflex mirror is shifted to picture-taking position, and the shutter is then again opened and closed to make the actual exposure on the film.

All of this is accomplished very quickly, of course, in less time than it takes to describe it.

DESCRIPTION OF THE PREFERRED EMBODIMENT

Figure 1A:
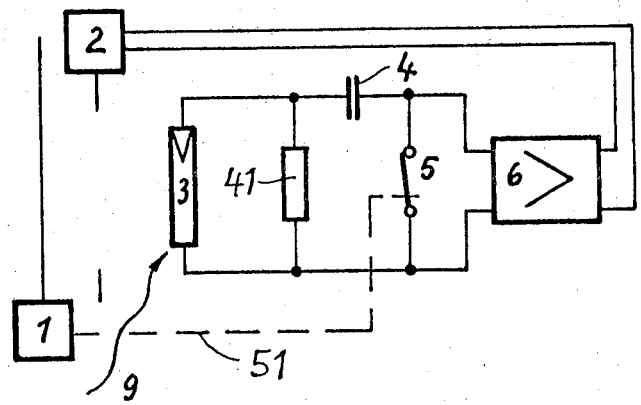
FIG. 1a is a schematic diagram of an arrangement in accordance with one embodiment of the invention, with the shutter closed and with the photoelectric converter subjected only to stray light.

Referring to the drawings, the camera has a central shutter or objective shutter indicated schematically at 1, with the shutter blades located as usual at an intermediate point between two of the elements or components of the usual conventional lens system, the lens system not being shown. Also located at the suitable point in the lens system is an automatically adjustable diaphragm schematically shown at 2. The light travels along the optical axis from left to right, through the shutter when it is open, and through the aperture in the diaphragm. Behind the lens system, in the direction of light travel, is the photoelectric converter 3. The converter is connected in series with a capacitor 4, and in parallel with a fixed resistor 41.

Behind the capacitor 4, and in parallel with the converter 3, is switching means 5 operatively connected to the shutter 1 in such a way that the switch 5 is closed when the shutter 1 is closed, and the switch is open when the shutter is open. This switch 5 may be either a mechanical switch, or an electronic switch such as a transistor of thyristor or the like. In the simplest form of construction it is a mechanical switch connected mechanically to any suitable conventional moving part of the shutter mechanism, by a mechanical connection indicated schematically at 51, to close the switch when the shutter closes and to open the switch when the shutter opens.

Behind the switch 5 (using the word "behind" in the electrical circuit sense, rather than with regard to physical location) and again in parallel with the photoelectric converter 3, is the amplifier 6, which is electrically connected to the control for adjusting the aperture of the diaphragm 2. The diaphragm aperture can be controlled in any known manner from the output of the amplifier 6, for example in the manner disclosed in the above mentioned copending patent application.

Figure 1B:
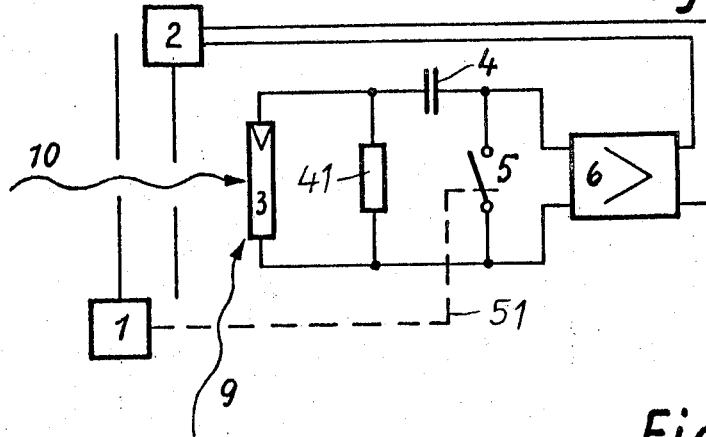
FIG. 1b is a similar view with the shutter open so that the photoelectric converter is subjected both to stray light and scene light.
Figure 2:
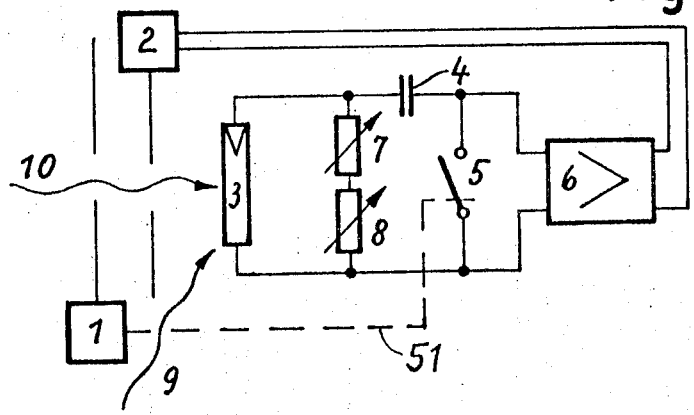
FIG. 2 is a similar view of a modified arrangement which includes a film speed setting potentiometer and a shutter speed setting potentiometer arranged in parallel with the photoelectric converter.

In an alternative arrangement, the fixed resistor 41 (FIGS. 1a and 1b) is replaced, as shown in FIG. 2, by an adjustable potentiometer 7 which may be used to adjust the circuit to the film speed of the particular film then being used in the camera, and an adjustable potentiometer 8 which may be used to adjust the circuit to the desired shutter speed or exposure time, assuming that the automatic adjustment is used for diaphragm aperture rather than shutter speed.

The operation is as follows: At the beginning of the pre-programming stage of the cycle, before the shutter runs its course or completes its cycle, the first operation is the closing of the shutter 1, for the exposure measuring process, so that the photoelectric converter 3 is now subjected only to the influence of stray light or interference light schematically indicated by the wavy line 9. The switch 5 is closed simultaneously with the closing of the shutter 1. The voltage at the input of the amplifier 6 thus becomes zero, although the converter 3 produces a photoelectric current as a result of the incident interference light or stray light 9. The capacitor 4 is charged by this current, up to the interference light voltage.

The shutter 1 is now opened, and simultaneously therewith the switch 5 is opened. The photoelectric converter 3 is now subjected to light from the scene to be photographed, indicated schematically by the wavy line 10, and also remains subjected to the same stray light 9 as before. Without the addition of the scene light 10, the input of the amplifier 6 would still be at zero. The converter 3, however, is supplied with the additional effective light 10, resulting in an additional effective light voltage which is the sum of the stray light voltage plus the scene light voltage across the resistor 41, or across the resistors 7 and 8 in the alternative arrangement.

As the capacitor 4, before the opening of the shutter 1, had been charged up to the stray light voltage, the only voltage occurring at the input of the amplifier 6 is the effective light voltage or scene light voltage. The known bridge balancing operation (see for example the above mentioned copending application) then takes place in the known manner, via the amplifier 6, which actuates the aperture setting mechanism of the diaphragm 2, to set the diaphragm to the proper value dependent only on the scene light or effective light, independently of the stray or interference light.

It is possible, of course, to use this same arrangement with a diaphragm of the kind which can be completely closed to zero aperture, thus constituting a combination diaphragm and shutter. With such an arrangement, the diaphragm rather than the shutter is completely closed while the reading of the stray light or interference light is taken and is fed into the capacitor 4. In such a case, of course, the switch 5 would be mechanically connected to the diaphragm, so that it would be closed when the diaphragm is completely closed, and open at other times.

What is claimed is:

1. A single lens reflex camera with an objective shutter, a photoelectric converter receiving light from a scene to be photographed, through said shutter when the shutter is open, and receiving stray light both when the shutter is open and when it is closed and having an output depending upon the light received, exposure factor regulating means having an input derived in part from an output of said converter, a storage element, switch means open when said shutter is open and closed when said shutter is closed, and circuit means including said converter, said storage element, and said switch means for impressing on said storage element a threshold value dependent on the output of said converter when subjected to the effect of only stray light on said converter while said shutter is closed, said circuit means simultaneously providing zero input to said regulating means, said circuit means also serving, when said shutter is open and said converter receives both stray light and scene light, to provide to said regulating means an input dependent on the amount by which the then output of said converter exceeds said threshold value previously impressed on said storage element, so that the input then supplied to said exposure factor regulating means is substantially independent of the effect of stray light on said photoelectric converter.

2. A photographic camera comprising shutter means, diaphragm aperture setting means, light sensitive means subject to stray light when the shutter means is closed and subject when the shutter means is open to stray light plus scene light from a scene to be photographed, said light sensitive means having an output varying according to the amount of light falling upon it, and operating means responsive to the difference in output of said light sensitive means when the shutter means is closed and when the shutter means is open for operating said aperture setting means in accordance with such difference.

3. A construction as defined in claim 2, wherein said camera is a single lens reflex camera, said light sensitive means includes a photoelectric converter, and said operating means includes a capacitor for storing a charge proportional to the stray light output of said converter when said shutter means is closed and a switch closed when said shutter means is closed and open when said shutter means is open, said switch when closed serving to prevent any output of said converter and any charge on said capacitor from influencing said aperture setting means and serving when open to connect said converter and said capacitor operatively to said aperture setting means.

4. A construction as defined in claim 2, wherein said light sensitive means includes a photoelectric converter, and said operating means includes a capacitor charged by the output of said converter, and wherein said shutter means has an operating cycle during which, prior to making an exposure, the shutter means is momentarily closed so that said capacitor will be charged to a threshold value by the output of said converter when subjected only to stray light, and the shutter means will then be opened so that said converter will have an output responsive to scene light plus stray light, said operating means being responsive only to the amount by which the output of said converter exceeds the previously measured threshold value.

5. A construction as defined in claim 1, wherein said circuit means includes a film speed potentiometer and a shutter speed setting potentiometer.

6. A construction as defined in claim 1, wherein the exposure factor regulating means regulates the factor of diaphragm aperture.

7. A construction as defined in claim 1, wherein the exposure factor regulating means regulates the factor of shutter speed.

* * * * *